United States Patent

Farr

[11] 3,833,272
[45] Sept. 3, 1974

[54] PEDAL-OPERATED HYDRAULIC CONTROL VALVE ASSEMBLY

[75] Inventor: Glyn Phillip Reginald Farr, Warwickshire, England

[73] Assignee: Girling Limited, Tyseley, Birmingham, England

[22] Filed: Sept. 22, 1972

[21] Appl. No.: 291,169

[30] Foreign Application Priority Data
Sept. 24, 1971   Great Britain................. 44621/71

[52] U.S. Cl............................... 303/52, 137/627.5
[51] Int. Cl............................................. B60t 15/06
[58] Field of Search............ 303/54, 50, 5, 6 R, 10, 303/84 R, 6 A; 60/54.5 P, 54.6 P; 188/151 R, 152; 137/627.5; 91/457

[56] References Cited
UNITED STATES PATENTS

| | | | |
|---|---|---|---|
| 2,452,647 | 11/1948 | Gagen................................... | 303/54 |
| 3,317,252 | 5/1967 | Gassman.............................. | 303/54 |
| 3,659,421 | 5/1972 | Wilson et al. ..................... | 60/54.5 P |
| 3,661,429 | 5/1972 | Kito..................................... | 303/54 |
| 3,684,330 | 8/1972 | Kito..................................... | 303/54 |

FOREIGN PATENTS OR APPLICATIONS

| | | | |
|---|---|---|---|
| 527,495 | 7/1956 | Canada............................ | 137/627.5 |

*Primary Examiner*—Duane A. Reger
*Assistant Examiner*—D. C. Butler
*Attorney, Agent, or Firm*—Scrivener Parker Scrivener & Clarke

[57] ABSTRACT

In a control valve assembly for an hydraulic braking system a brake housing has first, second, and third ports adapted to be respectively connected to a source of hydraulic fluid under pressure, to a brake actuator, and to a reservoir, a pedal-operated piston working in a bore in the housing acts through a spring on a second piston through which there is a passage providing communication between the second and third ports, and said passage is controlled by a normally open exhaust valve member which, on axial movement of the second piston closes and acts through a resilient connection to open a normally closed inlet valve member controlling communication between the first and second ports.

4 Claims, 4 Drawing Figures

PEDAL-OPERATED HYDRAULIC CONTROL VALVE ASSEMBLY

This invention relates to a new or improved pedal-operated hydraulic control valve assembly for a hydraulic braking system of a vehicle of the kind comprising a valve assembly located within a housing and operable in response to operation of the pedal to regulate the supply of hydraulic fluid from a first port in the housing for connection to a source of fluid under pressure, to a second port in the housing for connection to an hydraulic actuator of a brake, the second port being in communication with a reservoir in the off position of the brake.

In a control valve of that kind it is desirable to incorporate means for indicating to the operator when high pressure fluid is being metered through the port for connection to the actuator, such means applying a reaction or "feel" to the pedal in a direction to oppose the load applied thereto by the operator. This can be achieved by arranging for the high pressure fluid to react directly against a piston assembly through which the load is transmitted to the valve assembly.

According to our invention, a hydraulic control valve of the kind set forth comprises a body having a bore in which works a pedal-operated piston acting through a spring on a second piston, the body has three ports adapted to be connected respectively to a source of fluid under pressure, to a brake actuator or actuators, and to a reservoir, and the second piston incorporates a passage providing communication between the second and third ports and controlled by a normally open exhaust valve member acting through a resilient connection on a normally closed inlet valve member controlling communication between the first and second ports, axial movement of the second piston effecting closing of the exhaust valve member followed by opening of the inlet valve member.

The piston assembly may be of telescopic construction with a reduced diameter portion of the second piston which operates the valve assembly being received within a bore in an adjacent end of the first piston upon which the pedal acts through a push-rod.

Thus the fluid under pressure acts on opposite ends of the second piston which are of different areas and reacts against a face of the first piston which is equal in area to that of the end of the second piston which is of smaller area.

Conveniently the passage means comprises a longitudinal passage in the second piston providing communication between a portion of the bore in advance of the second piston and the space between the pistons in which the spring is located.

Four embodiments of our improved control valve are illustrated by way of example in the accompanying drawings in which.

Figure 1:
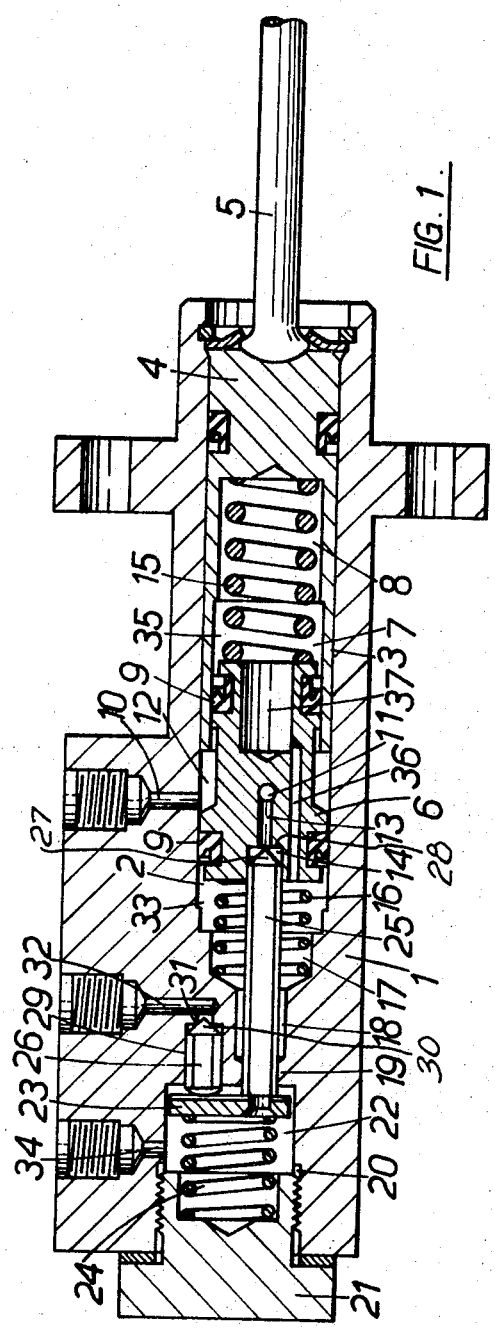
FIG. 1 is a longitudinal section of one form of control valve.

In the control valve illustrated in FIG. 1 a cylinder body 1 is provided with a longitudinally extending cylindrical bore 2 of constant diameter. A piston assembly 3 working in the bore is of telescopic construction and comprises a first piston 4 of constant diameter against the outer end of which abuts a pushrod 5 for connection to a pedal (not shown), and a second differential piston 6, of which an end portion of smaller diameter is received within a counterbore 7 at the free end of a blind axial bore 8 extending outwardly from an adjacent inner end of the first piston 4, and the opposite end portion works in the bore 2 in a position in advance of the piston 4. Each end portion of the piston 6 is provided with an annular seal 9 and the seals are spaced axially on opposite sides of a radial port 10 in the wall of the body 1 for connection to a reservoir for hydraulic fluid.

A diametrical bore 11 in the piston 6 communicates at opposite ends with an annular recess 12 located between the seals 9 and with a forwardly extending axial bore 13 which is provided with a counterbore 14 at its free end.

The pistons 4 and 6 are held in a predetermined spaced relationship by means of a helical compression spring 15 which abuts at opposite ends between the base of the blind bore 8 and the adjacent end of the piston 6.

The pistons 4 and 6 are held in the inoperative position shown in the drawings by a compression spring 16 housed within a portion 17 of reduced diameter at the inner end of the bore 2, and abutting at its outer end against a step at a change in diameter between the portion 17 and an opening 18 defined by an inwardly directed rib 19 adjacent to the inner end of the body 1. In this position the piston 4 abuts against a backstop at the adjacent outer end of the body 1.

The inner end of the body 1 is formed with an inwardly directed recess 20 of substantial diameter which terminates at the rib 19. The axis of the recess 20 is offset radially with respect to the opening 18, and the recess 20 is threaded internally, at least at its outermost end, to receive a threaded plug 21. A chamber 22 defined between the inner end of the plug 21 and the rib 19 accommodates a valve assembly. The valve assembly comprises a plate 23, which is urged towards the rib 19 by a helical compression spring 24, and a pair of radially spaced axially extending valve members 25 and 26 of different lengths. The longer valve member 25 comprises a rod which is secured at its outer end to the plate 23 and is guided to slide through the opening 18. The opposite end of the rod 25, which is pointed at 27, is received in the counterbore 14 and is normally spaced from a seating 28 at a shoulder at the step in diameter between the bore 13 and the counterbore 14. The shorter valve member 26 also comprises a rod which is guided to slide in a bore 29 in the body spaced radially above the axis of the bore 2. The plate 23 abuts the outer end of the rod 26 and the inner end 30 of the rod 26, which is pointed, is normally urged into engagement with a seating 31 communicating with a radial port 32 for connection to a source of hydraulic fluid under pressure, conveniently a high pressure pump or an hydraulic accumulator supplied by a high pressure pump.

The rods 25 and 26 are each formed with a pair of diametrical flats to permit fluid flow past the surfaces in which they are guided.

A pressure space 33 is defined by a portion of the bore 2 in advance of the piston 6. A radial port 34 in the wall of the body 1 for connection to an hydraulic actuator of a wheel brake communicates with the pressure space 33 through the clearance between the rod 25 and the opening 18 in which it is guided.

Passage means are incorporated for placing a space 35 defined between adjacent ends of the pistons 4 and 6 in communication at all times with the pressure space 33. As illustrated the piston 6 is provided with a longitudinal bore 36 extending from its inner end, which defines an end of the pressure space 33, to the base of a blind bore 37 extending outwardly from the inner end of the piston 6.

When the brake pedal is depressed to advance the rod 5 and the piston 4 in the bore, since the spring 15 is stronger than the spring 16, the piston 6 is advanced with the piston 4 until the pointed end 27 of the rod 25 engages with the seating 28 to cut-off communication between the port 10 and the pressure space 33.

Further movement of the piston 6 in the same direction carries with it the valve member 25 which in turn urges the plate 23 towards the plug 21 against the force in the compression spring 24 to permit the valve member 26 to move away from its seating 31. Thus fluid under pressure from the high pressure source enters the pressure space 33 through the clearance between the valve members 26 and 25 and their guide surfaces and the chamber 22, being supplied to the space 35 through the longitudinal bore 36. The pressure fluid is also supplied to the actuator connected to the port 34.

Loads on the valve members 25 and 26 both act to compress the spring 24. As the pressure rises in the chamber 22 the load on the valve member 26 decreases because the pressures tend to equalize and therefore the plate 23 bends to close the valve member 26 on to its seat without any backward movement of the piston 6.

The pressure of the fluid supplied to the space 35 acts on the inner end of the piston 6, and on the base of the blind bore 8 in the piston 4. Simultaneously an equal pressure is applied to the outer end of the piston 6 which is of greater area.

Thus the applying load is augmented by the pressure acting over the end of the piston 6 which is of smaller area, and is resisted by the pressure acting over the opposite end of the piston 6 which is of greater area.

A reaction force or "feel" is thus applied to the pedal of a magnitude equal to the pressure acting over the greater area of the piston 6. The spring force is equal to the pressure acting over the difference in areas between opposite ends of the piston 6.

When the pedal is released, the control valve assembly is restored to the inoperative position shown in the drawings under the influence of the springs 16 and 15.

Figure 2:
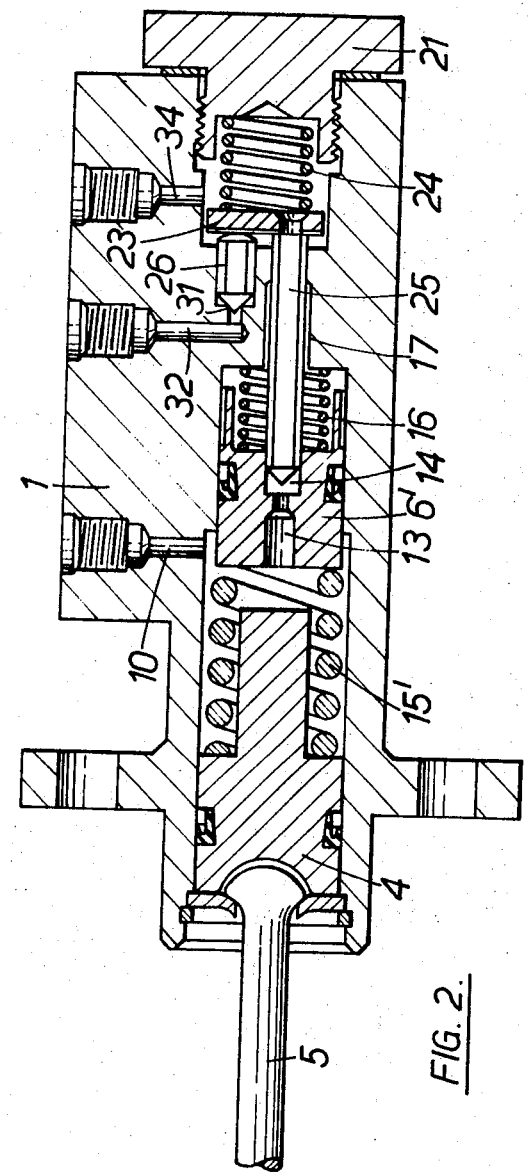
FIG. 2 is a longitudinal section of a modification of the form shown in FIG. 1.

In the modified valve shown in FIG. 2 the layout and operation of the valve members are exactly the same as in the first embodiment and the same reference numerals have been applied to corresponding parts. However in this modification the cylinder bore is stepped, the piston 6' working in the part of the bore of smaller diameter which is at the forward end. The passage 36 allowing access of pressure fluid to the space 35 between the pistons is omitted, and this space is in direct communication with the port 10 leading to the reservoir. The spring 15 between the pistons is replaced by a heavier spring 15' which provides the desired reaction on the pedal.

Figure 3:
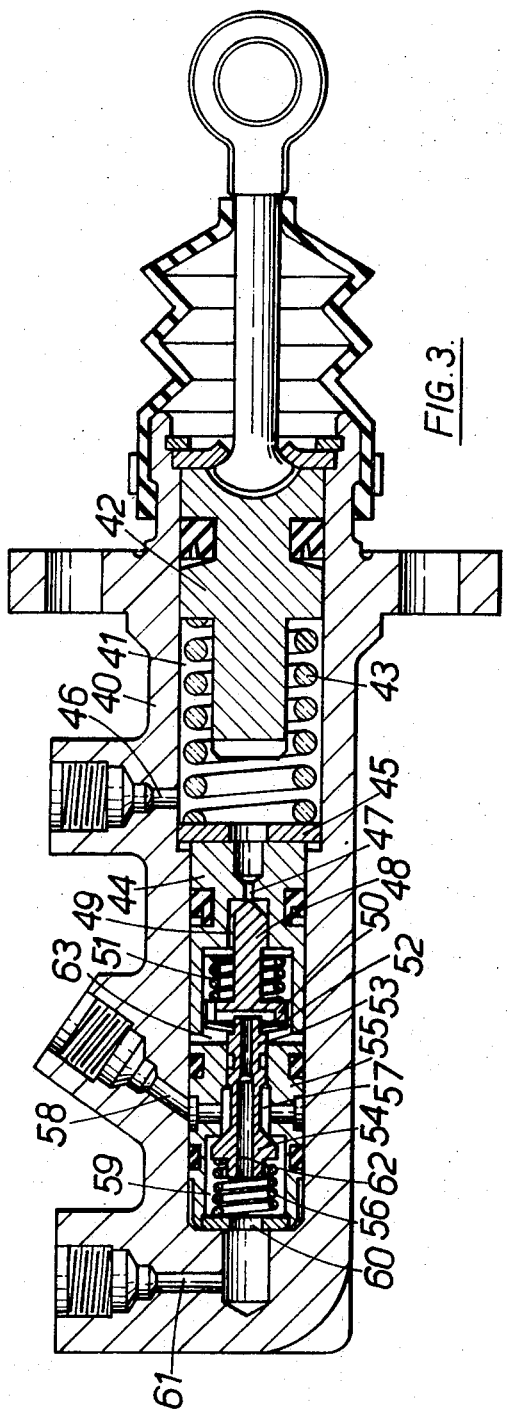
FIG. 3 is a longitudinal section of another form.

In the embodiment shown in FIG. 3 the body 40 has a stopped bore 41, a pedal-operated piston 42 working in the larger rear end of the bore. A spring 43 is located between the piston 42 and a second piston 44 working in the smaller end of the bore, the spring acting on the second piston through a washer 45. A port 46 adapted to be connected to a reservoir opens into the space between the pistons. The forward end of an axial passage 47 in the piston 44 provides a seating for an exhaust valve member 48 which is axially movable in a counterbored forward portion of the passage. A longitudinal groove 49 in the valve member allows fluid to flow past it when it is in the open position. At its forward end the valve member 48 has an enlarged head 50 located in a recess in the forward end of the piston, and a spring 51 located between the head and the inner end of the recess normally holds the valve member clear of its seating. A belleville washer 52 is located between the head 50 and the rear end of the stem 53 of an inlet valve member 54 working in an axial bore in a block 55, the coned head of the valve member being urged by a spring 56 into engagement with a seating at the forward end of a counterbore 57 in the block. The counterbore is in direct communication with a port 58 adapted to be connected to a source of fluid under pressure. The spring 56 is located in a recess 59 in the forward end of the block which is in communication through an opening 60 in the front end of the block with a port 61 adapted to be connected to a brake actuator or actuators. The recess 59 in in communication by way of an axial passage 62 in the valve member 54 with the space 63 in front of the piston 44.

In the off position of the brake the pressure fluid is acting on the valve member 54 in a direction to open it, but is held closed by the spring 56.

When the brake pedal is operated the piston 42 is advanced and compresses the spring 43 which, through the washer 45, advances the piston 44. This moves the seating of the exhaust valve member 48 into engagement with the valve member which, through the belleville washer 52, moves the inlet valve away from its seating against the action of the spring 56. Pressure fluid is thus admitted to the brake actuator or actuators connected to the port 61.

As the braking pressure increases the pressure drop across the inlet valve decreases and the spring 56 can move the valve member 54 towards its seating again, this movement compressing the belleville washer 52.

Thus the inlet valve can open and close to meter braking pressure without any axial movement of the piston 44.

Figure 4:
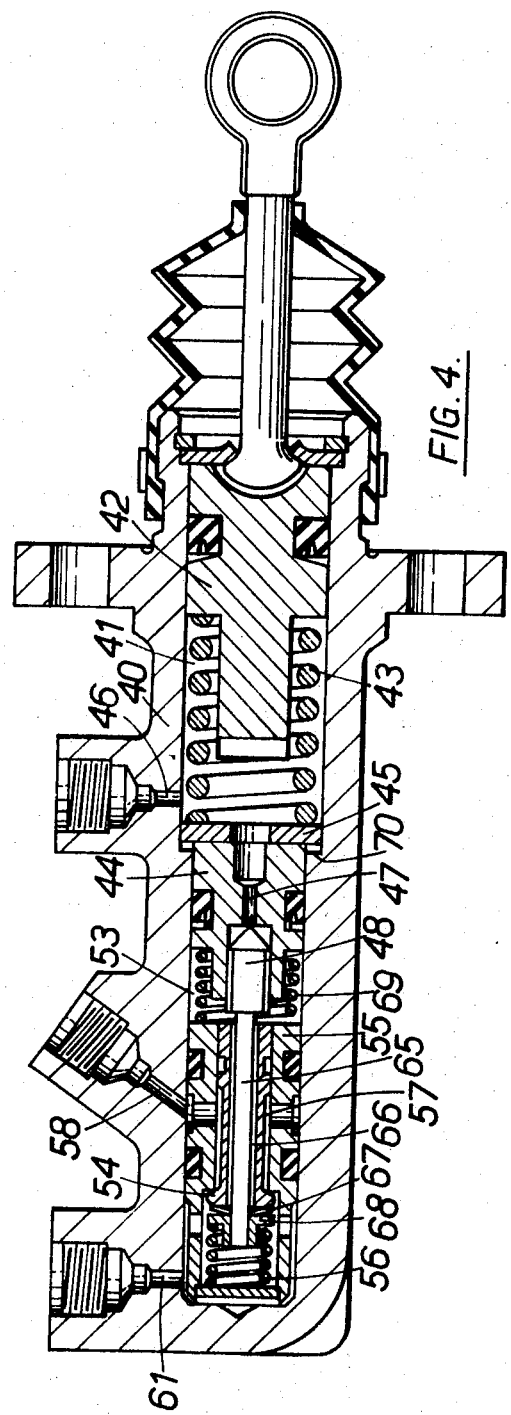
FIG. 4 is a longitudinal section of a modification of the form shown in FIG. 3.

In the embodiment shown in FIG. 4 the general arrangement is substantially the same as that shown in FIG. 3 and the same reference numerals have been applied to corresponding parts, but the form and interconnection of the valve members is slightly different.

The exhaust valve 48 has a forwardly extending axial stem 65 passing with clearance through an axial passage 66 in the tubular stem of the inlet valve 54.

A belleville washer 67 is located between the head of the inlet valve and a nut 68 fixed on the forward end of the stem of the inlet valve. The spring 56 acts on the inlet valve through the nut 68 and the belleville washer.

When the brake pedal is depressed the piston 42, through the spring 43, advances the piston 44 to close the exhaust valve 48. Further depression compresses the spring 56 and the load on the belleville washer is released so that the inlet valve is opened by the inlet pressure. The pressure drop across the inlet valve will progressively decrease with increasing braking pressure and the spring 56 will close the valve by compressing the belleville washer without moving the piston 44.

A compression spring 69 is located between the forward end of the piston 44 and the block 55, and a stop for the inward movement of the piston 42 is formed by the engagement of the washer 45 with the step 70 at the change in the diameter of the cylinder bore 41.

I claim:

1. A pedal-operated control valve for an hydraulic braking system comprising a housing incorporating first, second, and third ports for connection respectively to a source of fluid under pressure, to a hydraulic actuator, and to a reservoir with which said second port is in communication in the off position of the brake, and a valve assembly located within said housing and operable in response to actuation of the pedal to regulate the supply of hydraulic fluid from said first port to said second port, the housing having a bore therein, a pedal-operated piston working in said bore, a second piston working in said bore, a compression spring between said pistons, an exhaust passage through said second piston, a normally open exhaust valve member controlling said passage and adapted to be closed by axial movement of the second piston effected by axial movement of the pedal-operated piston, an inlet passage in the housing connecting said first and second ports, a normally closed inlet valve member controlling said passage, a resilient connection between said valve members and operating on said inlet valve member to retain said valve member normally closed, said resilient connection being responsive to the closing of said exhaust valve member to relieve the closing force on said inlet valve member and permit it to open by the inlet pressure entering the first port.

2. An hydraulic control valve as in claim 1 wherein the passage through the second piston admits pressure fluid to a space between the pistons when the inlet valve member is open to provide a reaction on the pedal-operated first piston.

3. An hydraulic control valve as in claim 1 wherein the valve members are in axial alignment and the resilient connection between them comprises a Belleville washer through which axial movement of the exhaust valve member is transmitted to the inlet valve member and which permits independent axial movement of the inlet valve member under variations in the pressure drop across the inlet valve member when that is open.

4. A hydraulic control valve as in claim 1 wherein the resilient connection between the valve members is arranged to permit movement of the inlet valve member towards and away from its closed position without the movement of the exhaust valve member from its closed position.

* * * * *